(12) United States Patent
Daneshvar

(10) Patent No.: US 8,777,542 B2
(45) Date of Patent: Jul. 15, 2014

(54) DANESHVAR CARRIER MEANS AND METHODS

(76) Inventor: Yousef Daneshvar, Westbloomfield, MI (US)

(*) Notice: Subject to any disclaimer, the term of this patent is extended or adjusted under 35 U.S.C. 154(b) by 2870 days.

(21) Appl. No.: 11/092,311

(22) Filed: Mar. 29, 2005

(65) Prior Publication Data
US 2005/0214091 A1 Sep. 29, 2005

Related U.S. Application Data

(60) Provisional application No. 60/556,787, filed on Mar. 29, 2004.

(51) Int. Cl.
*B60P 3/06* (2006.01)
*A61G 3/00* (2006.01)
*A61G 3/02* (2006.01)
*B60R 9/06* (2006.01)

(52) U.S. Cl.
USPC .......................... 414/462; 224/527; 414/580

(58) Field of Classification Search
USPC ......... 414/462, 464, 465, 466, 537, 921, 680, 414/540, 482; 296/37.2, 37.1, 55, 56, 57.1, 296/43, 61; 280/763.1; 410/3, 4; 224/488, 224/527, 521, 524, 506, 526, 529; 206/335, 206/588, 592
See application file for complete search history.

(56) References Cited

U.S. PATENT DOCUMENTS

| | | | | |
|---|---|---|---|---|
| 2,611,466 A * | 9/1952 | Biggert et. al. | ............. | 193/41 |
| 3,294,034 A * | 12/1966 | Bodenheimer et al. | ......... | 410/1 |
| 3,458,073 A * | 7/1969 | Dawson | ..................... | 414/462 |
| 4,475,761 A * | 10/1984 | Milroy et al. | ................. | 296/61 |
| 5,033,662 A * | 7/1991 | Godin | .......................... | 224/521 |
| 5,133,459 A * | 7/1992 | Genix | .......................... | 206/586 |
| 5,199,842 A * | 4/1993 | Watt et al. | ..................... | 414/537 |
| 5,431,524 A * | 7/1995 | Antal et al. | ................... | 414/537 |
| 5,680,976 A * | 10/1997 | Koliopoulos et al. | ......... | 224/524 |
| 5,826,768 A * | 10/1998 | Gamulo | ...................... | 224/486 |
| 6,216,867 B1 * | 4/2001 | Haseltine et al. | ............ | 206/335 |
| 6,379,101 B1 * | 4/2002 | Breaux | ........................ | 414/537 |
| 2002/0108951 A1 * | 8/2002 | Zelko | ............................. | 220/7 |
| 2003/0190207 A1 * | 10/2003 | Junge | .............................. | 410/3 |

* cited by examiner

*Primary Examiner* — Gregory Adams

(57) ABSTRACT

The advanced life has brought the use of strollers, wheelchairs and carriers for easing the life and human care. However, handling these objects in and out of a vehicle has turned to be a practical problem. Commonly these units are lifted for placement in the trunk or inside a vehicle, however, manipulation of these units which have a noticeable weight and a rough shape are difficult and labor intensive. Particularly, by some mothers that does not have enough reserve doing other chores. This activity will increase the pain of those who just had C-sections or it can cause a new back and joint pains or worsen the existing ones. This application introduces methods and means to allow such a process to be done easily. This application introduces new units and methods which allows strollers and carriers and similar units to be placed inside a box means which is attached to the rear of a vehicle by use of a door that opens and stands on the ground to function as a ramp. This allows a wheeled unit to be wheeled up into the box and be kept inside the box means by means that are designed to prevent it from moving. The ramp will close as a door and locked. Thus this method will simplify the process of moving these objects and will practically eliminate the need for bending and lifting of such units. The box means will also function as a protector from rain, snow and bad environment.

2 Claims, 10 Drawing Sheets

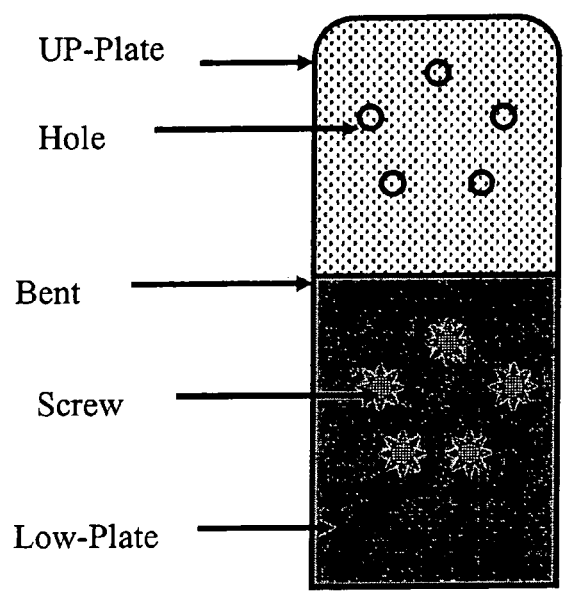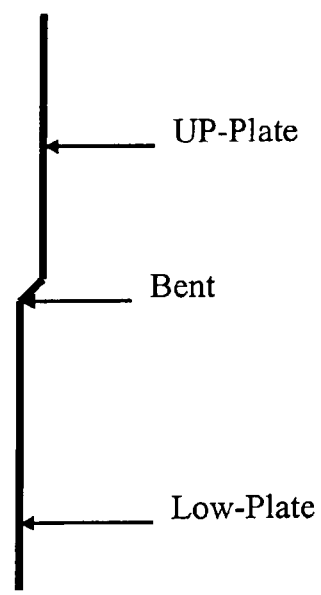
Figure 9                                  Figure 9A

DANESHVAR CARRIER MEANS AND METHODS

This is a regular application requesting the priority of the following provisional application: Filing #60/556,787 filing date Mar. 29, 2004.

THE BACKGROUND OF THIS INVENTION

The advanced life has brought the use of units such as the strollers, wheelchairs and scooters etc., for human care. However, handling these objects in and out of a vehicle is a practical problem. Commonly these units are lifted for placement in the trunk or inside a vehicle, however, manipulation of these units with a noticeable weight and a rough shape are difficult and labor intensive, particularly in cases which the user has limited reserve or physical tolerance. Which in those cases the placement of such units in and out of the vehicle, can cause a new back and joint pains or worsen the existing ones. This application introduces methods and means to allow such a process to be done easily.

THE BRIEF EXPLANATION OF THE INVENTION

This application introduces new methods and means which allows units such as the strollers, wheelchairs, scooters and similar things, to be placed in the vehs easily. This method consists having a box means that is attached to the rear of a vehicle and it has a door means that opens and it can be placed on the ground to function as a ramp. This ramp allows a unit with wheels to be wheeled up into the box and be kept inside the box means. This box means has pads and other restraint means that are designed to prevent it from moving. The ramp means then will close as a door and locked. Thus this method will simplify this process and will practically eliminate the need for bending and lifting of these objects. The box means will also function as a protector from rain, snow and bad environment. Also the method explained in this application allows the box means to be moved away from the rear of the vehicle, in order to allow the trunk or the back of the vehicle, to be accessed.

THE FIGURES

Please notice that some parts of this invention are shown in different figures. This is to prevent a crowded picture. Importantly, please also note that many of the options are designed to be used in one model if applicable.

BRIEF EXPLANATION OF THE FIGURES

FIG. 9. Shows schematically an adaptors which allows the existing attachment means of a vehicle to be modified for use with this carrier.

FIG. 9A. Shows schematically the side view of the adaptors shown in previous FIG. 9.

THE DETAILED EXPLANATIONS OF THE FIGURES

Figure 1:
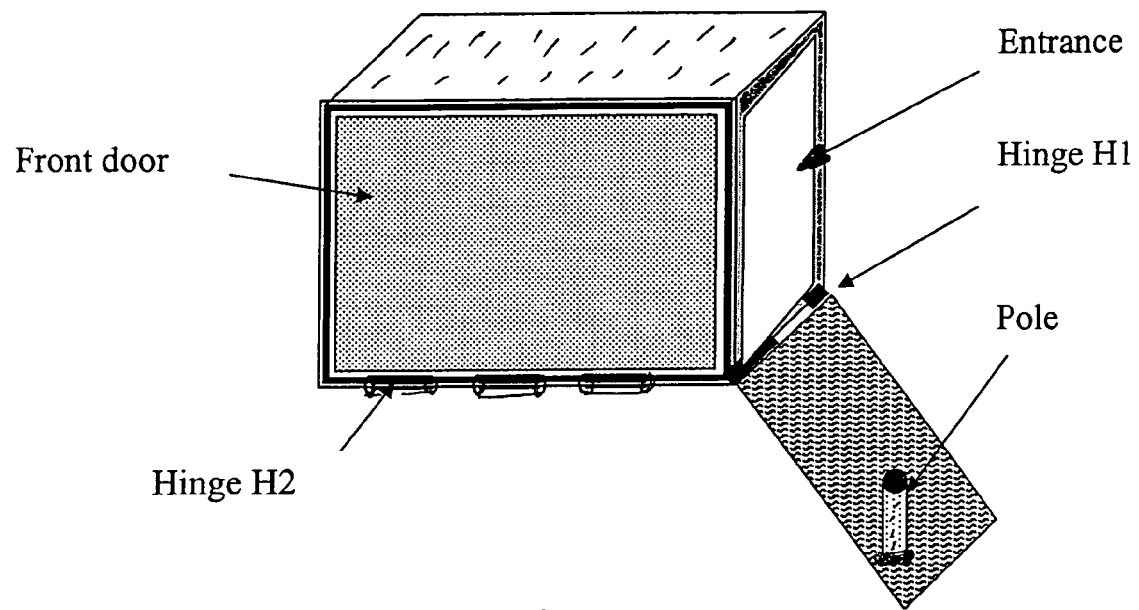
FIG. 1. Shows the body of the carrier means which consists of a box means with six walls.

FIG. 1. Shows the general figure of the carrier means. This carrier means contains a box means which has a rather rectangular, cubic shape with six walls as follows.

A. A lower wall, that is the base of this box means. It has a rather flat shape and stands in a horizontal condition in order to allow the object to stand on it. This base has an attachment means, ATM best shown at FIG. 2 which is like a pole and connects the lower wall or the base piece to the body or the wall of a vehicle, commonly in the rear of the vehicle.

Figure 2:
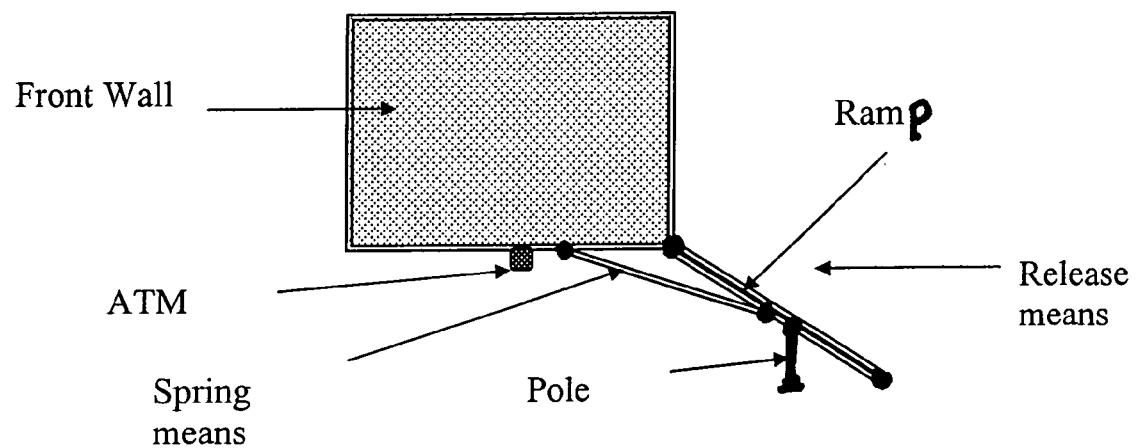
FIG. 2. Shows the front view of the carrier means, which the right wall is in an open position functioning as a ramp.

B. The right side wall of this carrier means is a wall which is attached to the base or the side of the carrier means by a hinge and can be opened to be placed on the ground. This wall plays a vital role in function of this carrier means by acting as a door, that opens along a hinge, Hinge H1, and moves to stand on the ground as a ramp, Ramp. This wall has a pole, Pole on its outer surface that functions as a handle that allows the door to be pulled and also it stands on the ground for holding the free end of the ramp above the ground for preventing it from being soiled. A spring means, Spring Means shown at FIG. 2 is attached to both the ramp, Ramp and the base or the body of the carrier means in a special position so that it will hold the door=ramp in a closed position when the door is closed. Also it will keep the door open when it is opened and placed on the ground to function as the ramp. Please note that the pole, Pole stands between the lower surface of the ramp and the ground. Importantly, the size and shape of this pole may vary since some units may need significant support to be able to tolerate the heavy units such as scooters.

C. The front wall of this unit which is a vertical wall, also has an important function since it is hinged at Hinge H2 to the lower wall or the base of the unit and opens to allow accessing the inside of the box means. Also it may function as a ramp. This wall allows the box means to be accessed for adjusting the objects placed inside it. In this figure this door is shown in closed position.

D. The left wall of this unit functions as a wall. It may have pads or cushions for proper placement and protection of the object.

E. The top wall of this box shaped unit, functions as a wall, although it may have a hinge to allow it to open for accessing the box. It may also have pads or cushions for proper placement and protection of the objects.

F. The rear wall of this unit is a vertical wall and functions as a wall means and will make the rear of the box means. In some models this wall means may have means for allowing it to be attached to the vehicle. It may also have pads or cushions for proper placement and protection of the object.

Importantly, the body of this box means may be modified to make it more convenient and useable for various uses. It may be made to have a shape such as a suit case except with a third wall in the side to function as the ramp. Thus the walls may blend one on another, so that one wall piece to function as two or more walls, such as the base and the rear wall, or the base, the back wall and the left side wall etc.

In the case of the suitcase shape, the upper and the side walls would be made up from combinations of two walls and the base will be a complete wall of itself or two walls one inside the other etc. ????

Or the box means may have different materials in different parts of the walls. Importantly, in certain models the design of the carrier means may be modified very differently for example the unit may have the base and the ramp and may have the screen means or net means for holding the object in place.

Even in some of such models the ramp may be eliminated.

Also importantly the box means may have inner shelves or compartments in order to allow the user to place other objects to be carried such as placing groceries or hand bags inside that compartment if desired. These shelves may be optional and they may be placed or removed, on a desirable basis.

FIG. 2. Shows the front view of the carrier when the observer is looking straight forward to the box from the rear of the vehicle. This view shows the carrier means when the right side wall in an open position functioning as a ramp, Ramp. The pole, Pole is rotated to the vertical position in order to stand on the ground and prevents the free end of the door from touching the ground and being soiled. Also the pole plays as a stabilizing means and hold the ramp in a straight position and prevents it from being bent down when the object is moved on it. A spring means, Spring Means is attached to the base and the ramp in a point that will hold the door in closed position and also will keep it in open position when the door is opened.

The lower wall=base of this the carrier means has an attachment pole which its cross cut is shown at ATM. This pole means the base of this carrier means to the connection means of the vehicle, which is commonly located in the rear of the vehicle. Other forms of attachment means may be used for the purpose of attaching or connecting the carrier means to the vehicle. The attachment means may also be attached to the rear wall of the carrier means as well. Also different means may be used in order to allow the carrier means to be connected securely to various vehicles.

Figure 3:
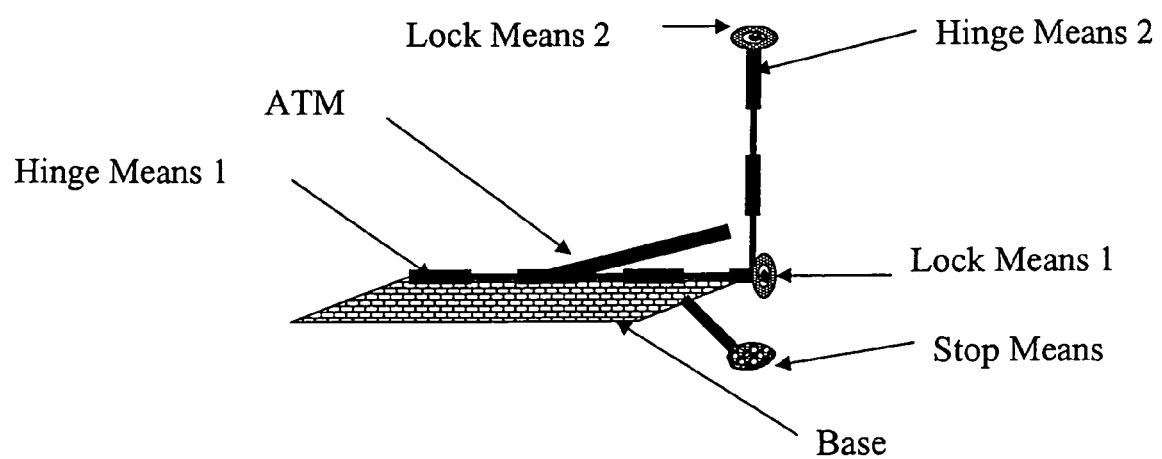
FIG. 3. Shows a system of the attachment for the carrier, this system allows the carrier to be attached to the vehicle, then to be tilted and rotated.

FIG. 3. Shows schematically a system of attachment means which allows the box means=the carrier means to be connected to the vehicle, and to be tilted and rotated when needed. This system has.

a. A base means, Base that allows the bottom/lower surface of the box means shown at FIG. 1-2 to be placed and attached to it. A horizontal hinge means, b. It has an attachment means, ATM which is like a pole and is designed to engaged and be connected to the body of the vehicle by a commonly used methods such as the connection means for pulling the boats.

c. A horizontal hinge means, Hinge Means 1 with a lock means, Lock Means 1. This hinge means allows the base which will have the box means on it, to be tilted on a horizontal axis. So that the rear part of the vehicle can be accessed. The lock means will keep this hinge means in a locked position. The lock means will be made from various known means so that when the lock means gets engaged the hinge means will stay in a locked condition and will not move.

d. A vertical hinge means, Hinge Means 2 with a lock means, Lock Means 2. This hinge means allows the base which will have the box means on it, to be rotated on a vertical axis. So that it will open similar to a door, to allow the rear part of the vehicle to be accessed. The lock means will keep this hinge means in a locked position. Also importantly, the lock means, Lock Means 1 and Lock Means 2 are designed to lock these hinges so that only one of hinges will be functional at a time. Also to lock both of them when desired such as during the period which the vehicle is moving.

e. Also the system has a stop means, Stop Means, which is designed to be used from moving the box means to an unwanted position such as tilting more than 90 degree or a predesigned level. In this model the stop means will come to stop at the body of the vehicle and prevent further movement of the box. Many other models of such a stop means may be used.

The base, Base has the attachment means, ATM which is like a pole and connects to the rear of a vehicle, to a commonly used attachment means in the rear of the vehicle, commonly used for pulling the trailers etc.

Importantly, the attachment pole may consist of two or more parts to allow one piece to be attached to the vehicle on permanent basis and the second part to be attached to the carrier and these two pieces to be attached to each other on a detachable re-attachable basis.

Figure 4:
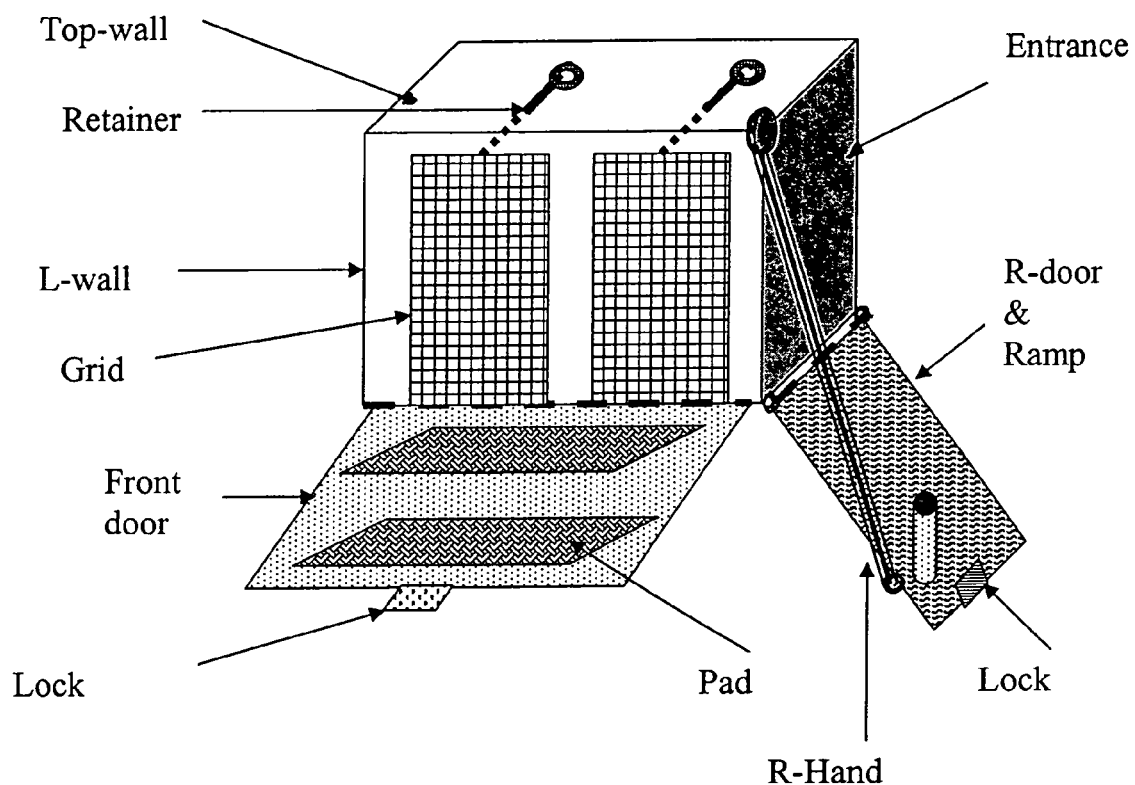
FIG. 4. Shows another view of the carrier means, in order to specify some of the important parts.

FIG. 4. Shows another view of the carrier means in order to specify some of the important parts. This figure shows the front door, Front Door in open position indicating that it can function as a ramp. This door has a lock means, Lock, which allows the door to be kept in a close position.

Also this figure shows a grid means, Grid that consists of two pieces one in the right and the other one in the left, designed to be pulled and hold the object inside the carrier means in a stable position. These grid means have retainers, Retainer that allows the grid means to be pulled and hold in a fixed position. The grid may be made from a flexible material such as a net or any other materials, such as fabrics depending the case. The function of the grid is to be pulled toward the rear wall in order to hold the object inside the box in a tight and secure position and prevent it from free movements. Initially the grid means will be posed away from the object to allow an open space for the placement of the object, however after the placement of the object the grid means will be pulled toward the rear wall of the carrier means by use of the retainer, Retainer in order to keep the object tightly. The function of the grid means is important since it prevents the damages to the object, otherwise the object will be loose inside the box while the vehicle is moving. The grid may be removed if desired. Importantly, the shape, size and various important specifics of this piece will be changed to match the need.

Also importantly, this figure shows a series of the pads means, PAD located on the inside surface of the front door. These pad means are designed to match the shape and make up of the objects so that the closure of the door will press the pad means against the object and prevent from the movement of the object and damages.

These pads may be made.
1. To be preshaped, such as shaped foams.
2. To be positioned in different places or chosen differently, such as having an attachment means such as hook and loop fastener so that their position, sizes or their selections to be changed easily.
3. They may be made from inflatable balloons or pads. So that initially the unit is flat or away from the object to allow the object to be placed then the balloon to be inflated to be functional and to hold the object tight in the proper position.
4. They may be made from adjustable pads. So that initially the pad is kept away from the object to allow the object to be placed inside the box then after the object is in place, the pad will be pushed forward by various means such as handles etc. In order to be pushed to act and hold the object tight in the proper position. In example shown in this figure the pad means, Pad is away from the object when the front wall is open, but with the closure of the door the pad means will force the object toward the rear wall and keep it stable.
5. Any restraint means which can be used for keeping the objects in place securely.
6. Combinations of various means for protection and holding the object position.
7. Importantly, the unit may have restraints that will be placed when the object is in place and the front door is open and then after the object is properly restrained the front door will be closed to further keep the object in stable position with use of its pad means etc.
8. The unit may have means such as snaps and screws in order to allow a pad means or a spring means or a restraint means to be pushed or screwed in order to make a compression against the object for holding it in the position.

Importantly, the use of these pads, balloons or the restraint means are not limited to the front door, or nay parts since these means may be also placed in other areas such as the back wall the top wall etc. In order to make the box means more hospitable and safe for the object being placed.

This figure also shows a handle, R-Hand that has two ends and one end is attached to the ramp by a hinge means and the other end is removably attached to the body of the carrier by a detachable reattachable means such as a hook and loop fastener. The detachable end of this unit allows the user to hold it and pull up the ramp without the need for bending. This will prevent from back discomfort. After the closure the free end of the R-Hand will be attached to the body of the carrier by another detachable reattachable means such as a hook and loop fastener. This handle may have an adjustable body to allow it to be longer or shorter.

Figure 5:
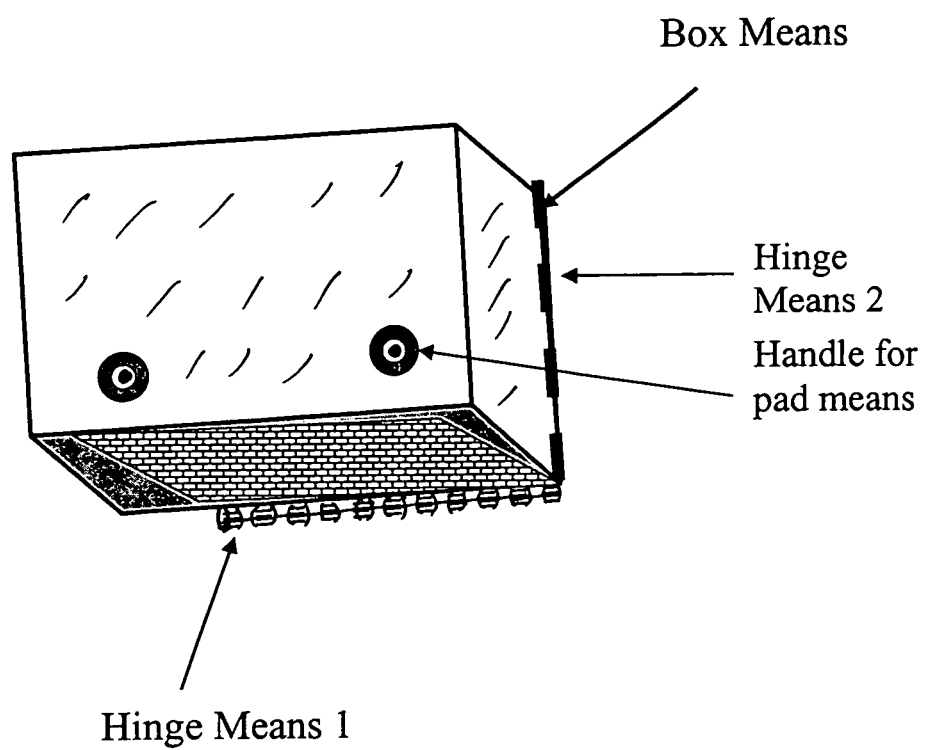
FIG. 5. Shows specifically the position of the hinge means 1, in the base and the Hinge Means 2 located on the side of the box means.

FIG. 5. Shows specifically a box means, Box Means that is placed on a system of attachment means shown at FIG. 3. In this figure the position of the hinge means, Hinge Means 1 is shown, located in the base of the unit. This hinge means allows the whole unit, (the base and the box=carrier means) to be tilted forward in order to allow the rear of the car such as the trunk to be accessed. Also the position of the hinge means, Hinge Means 2 is shown located, in the vertical edge of the box means, Box Means. This hinge means allows the box means to be rotated from the rear of the vehicle, to the right side of the vehicle, so that the rear of the vehicle, such as the rear door to be accessed.

Please note that if the box means is attached to the rear door of a vehicle, then the use of the hinge means will not be needed and they can be eliminated from these units.

Importantly, the FIG. 5 also shows handle means on the front wall that attaches to a pad means inside the box means by a screw. So that by rotation of this screw means the pad means will move forward inside the box means to compress the object for holding it in the position. The rotation of these screw means in the other direction will move the pad means away from the objects.

Other means such as snaps means or handles may be also used in order to allow a pad means, a spring means or a restraint means etc., to be pushed forward for the compression against the object for holding it in the position. Other means may be used as well.

Figure 6:
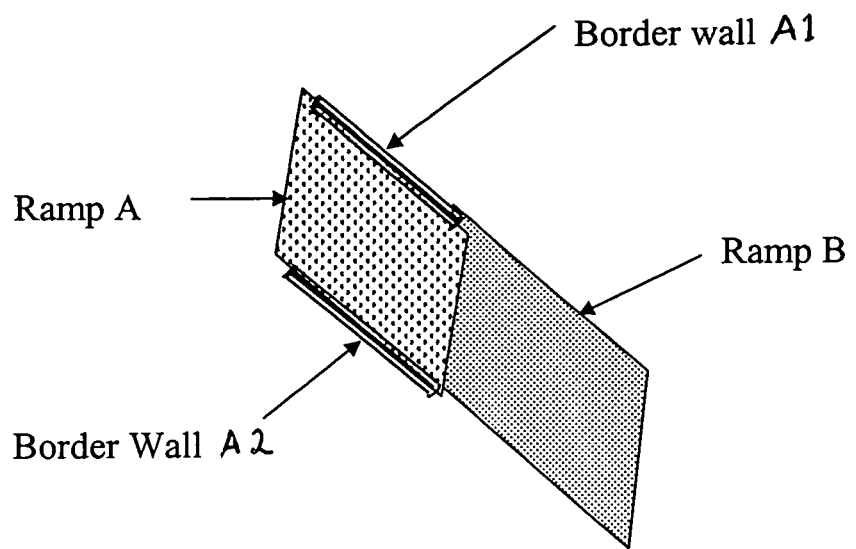
FIG. 6. Shows a ramp means that consist from combination of two pieces which one of them slides into the other.

FIG. 6. Shows schematically a ramp means that consist from combination of two pieces which one of them slides over the other. In this figure the ramp, Ramp A has borders, shown as Border Wall A1 and A2 which allow the ramp, Ramp B to slide into it. This method is for allowing the length of the ramp means to be adjusted. In another method the ramp may have two pieces which folds over another.

Figure 7:
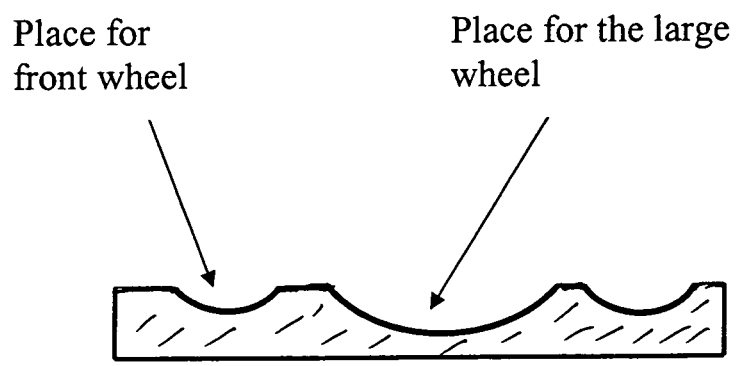
FIG. 7. Shows schematically a cradle means for the floor of the box means, so that it will keep the objects inside more securely.

FIG. 7. Shows schematically a cradle means, which is designed to be placed on the floor of the box means, so that it will function in keeping the objects inside more securely. This unit for example is designed to allow a wheel chair to be wheels on it and it will accept the wheels of the wheel chair and will prevent them from moving. The place for the smaller front wheels and the place for the large wheels are shown.

Figure 8:
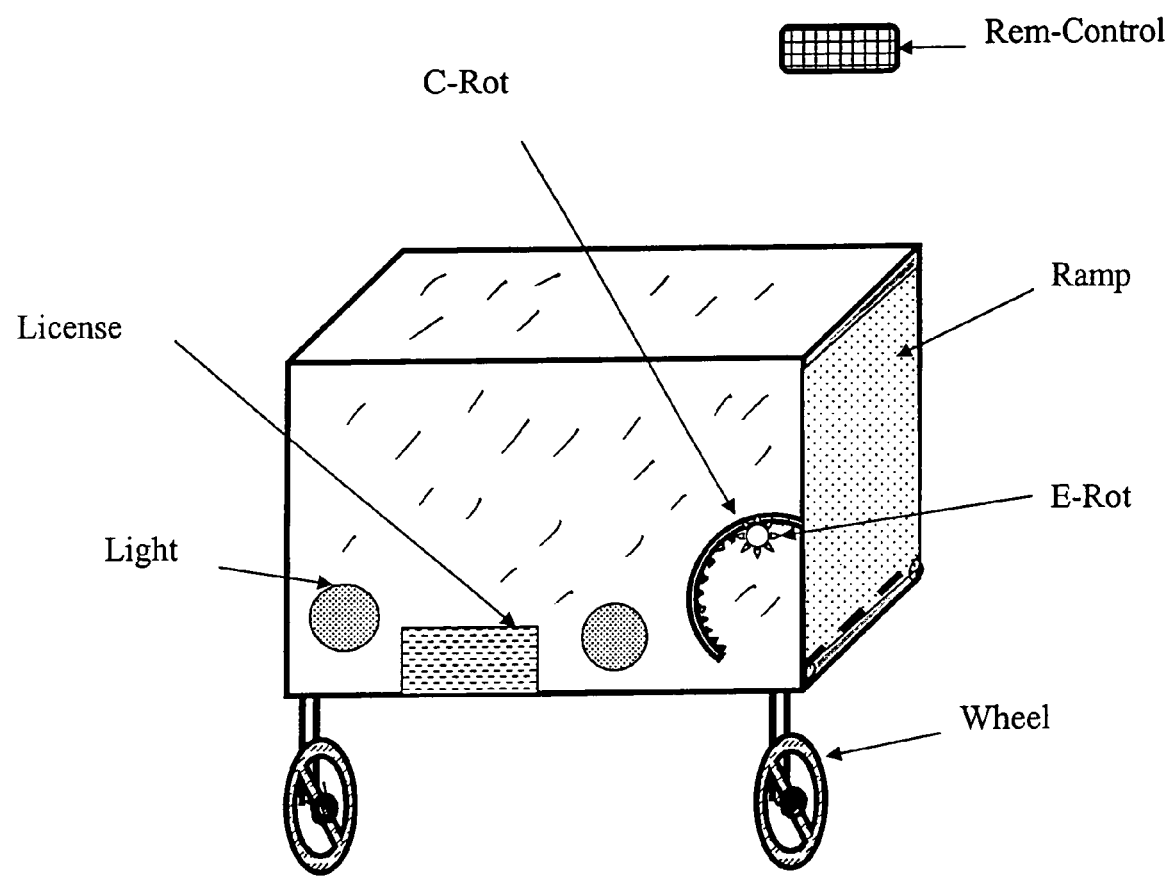
FIG. 8. Shows schematically a modified version of a carrier shown at FIG. 1 which is equipped with wheels.

FIG. 8. Shows schematically a modified version of a carrier means shown at FIG. 1 which is equipped with wheels so that it allows the weight of the box means to be tolerated and transmitted to the street.

The unit may have more than one set of wheels. Also this model shows a version which an electrical method is utilized in order to open and close the door, Ramp automatically. This will eliminate the manual work for opening and closing of the ramp and is more useful when the door is heavy or the user prefers not to open or close the door by hand. The prototype of this unit is made by having a C shaped piece, C-Rot which has the engagement means, such as teeth on it and comes in contact with the teeth of the matching wheel, E-Rot from an electrical motor. So that the rotation of E-Rot will rotate the C-Rot and since the C-Rot is attached to the door means, Ramp, thus it will open or close the Ramp by use of the electrical engine means. This unit may be further intensified by use of a remote controller, Rem-Control of the electrical motor which allows the ramp to be opened and closed. This carrier means will simplify the use of this unit and will be beneficial in cases which further simplification is needed. This model will be more useful for the movement of units such as electrical scooters etc. This figure also shows the light means, light that would be connected to the signal lights of the vehicle. Also has place for a license plate, License.

FIG. 9. Shows schematically an adaptor means which allows the existing attachment means of a vehicle in the rear such as place for holding the spare tire to be modified for allowing to attach to the rear of a carrier means shown at FIG. 1. In this figure an upper plate, UP-Plate has holes, Hole which matches the location of holes from the site for mounting the spare tire. This allows this plate to be placed and screwed into the place for the spare tire. This plate means has a curved or angled area, Bent which provides a vertical distance between the first and second plate. Then the continuation of the first plate makes the lower plate, Low-Plate which is equipped with a set of screws, Screw, designed to allow the rear wall of the box means to be placed and screwed to this plate in order to be secured. This modification will allow the height of the box means to be adjusted in order to allow the ramp to be in a proper position to allow it to be easily placed on the ground for use. Importantly, the shape of this unit may be modified with various bends and shapes in order to allow it to be useful in different models of vehicle, and various positions of the attachment means. In the cases which the tire mounts to the bottom of the vehicles this unit may have a rectangular bent.

FIG. 9A. Shows schematically the side view of the adaptor means shown in previous FIG. 9. In this figure the upper plate, UP-Plate the angled area, Bent and the another plate, Low-Plate are shown. Again importantly, the angled area, Bent will have different sizes.

Figure 10:
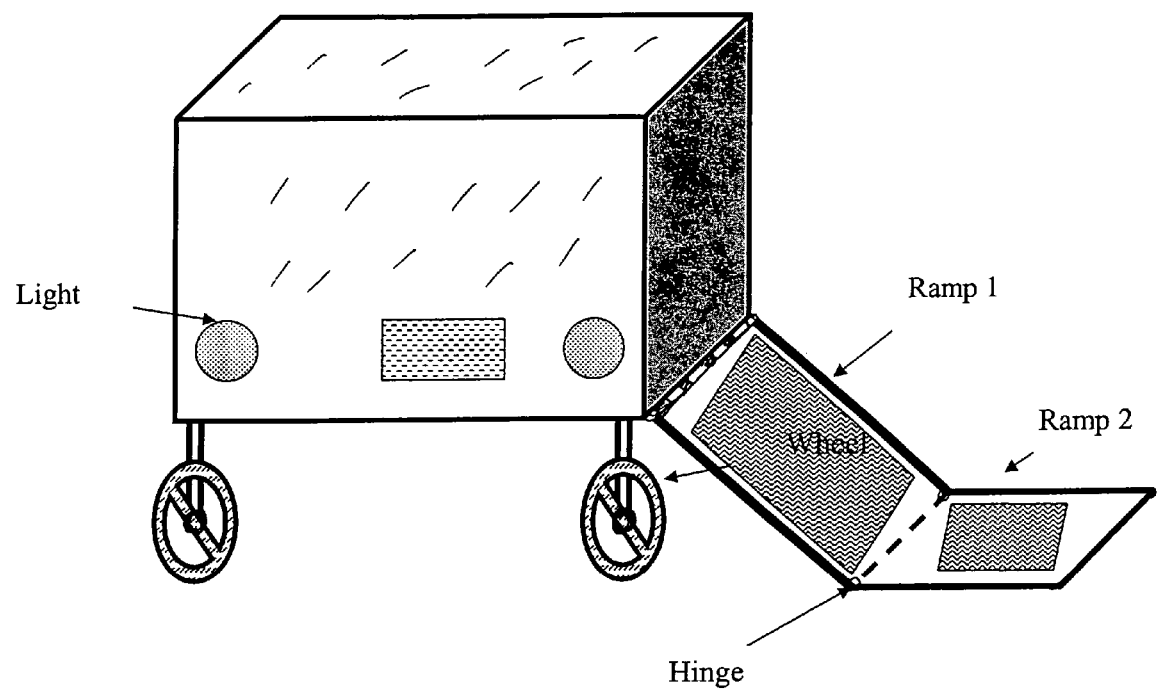
FIG. 10. Shows a carrier shown at FIG. 8 with a door which consists from two pieces that allows one to be placed on the ground.

FIG. 10. Shows a unit similar to the version of a carrier shown at FIG. 8 except this door of this unit consists from two pieces that allows one piece, Ramp 2 to be placed on the ground to facilitate the movement of the scooter to the carrier and prevent from unwanted movement of the ramp. This provides a steady unit. After use, the Ramp 2 will fold on Ramp 1 and close. The surfaces of these ramps are covered with materials to prevent slipping of the scooter. The hinge, Hinge, is also marked.

Figures 11, 12:
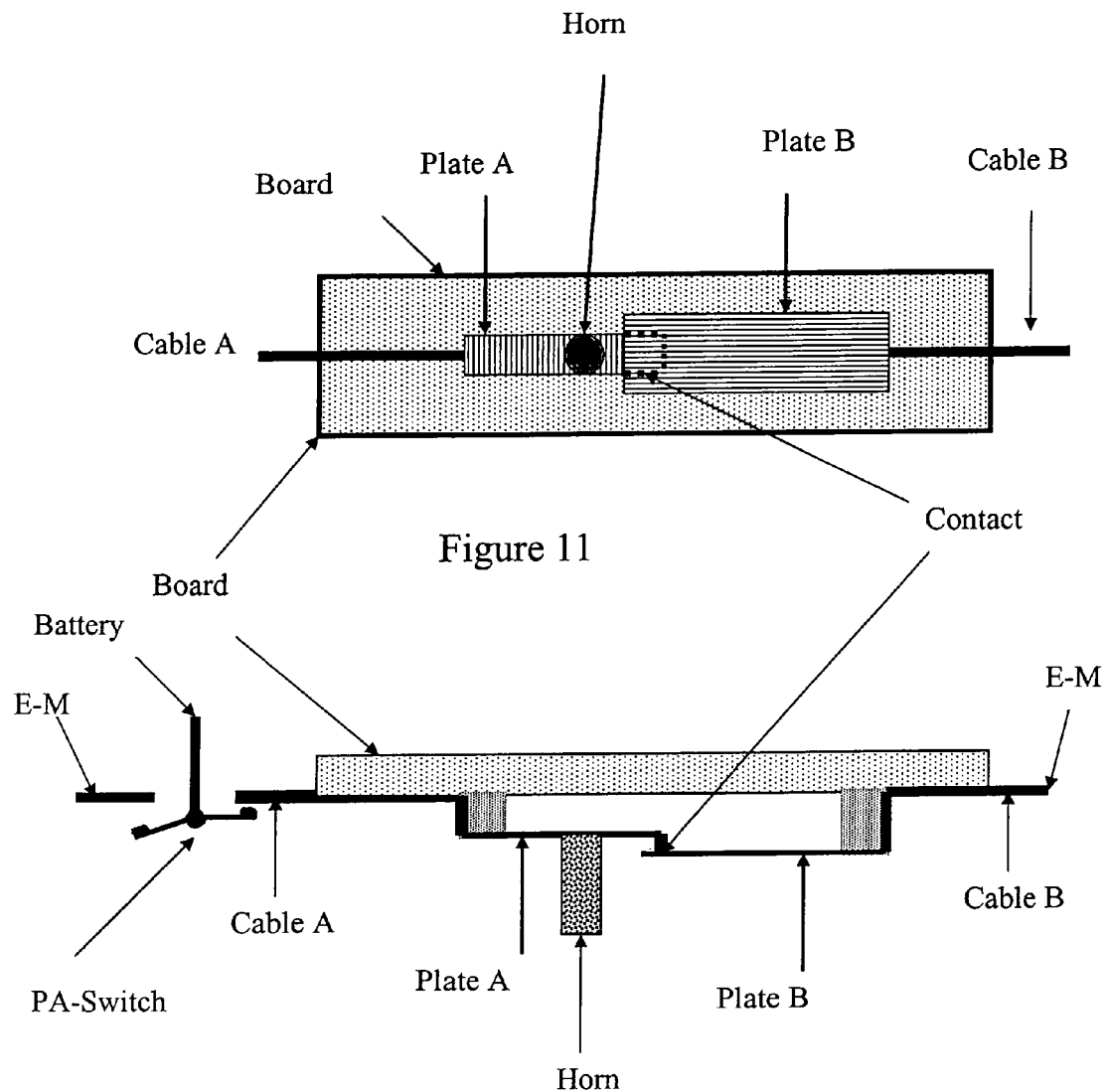
FIG. 11. Shows a method of making an electrical scooter to be placed inside a carrier in a controlled manner to prevent it from hitting the opposite wall.
FIG. 12. Shows schematically the top view the unit shown at previous figure and gives the position of various parts.

FIG. 11. Shows schematically a method of making an electrical scooter to be placed inside a carrier means and be kept in proper position inside without hitting the opposite wall, without control to damage. This figure shows the front view of a unit consisting of various part such as a board, Board which holds two electrically conduction spring plates shown at Plate A and Plate B. These plates are electrically conductive and connected to the electrical cables, Cable A and Cable B and are in contact electrically at point Contact. Per design the plate, Plate A will separate from Plate B to disconnect the electrical system when the piece, Horn is pressed, thus it will disconnect the electrical current coming from Cable A to the Cable B. The unit has also a switch, PA-Switch which is shown at FIG. 12. This unit will be attached to the front bumper of the electrical scooter and the main cable from the electrical system of the scooter will be cut and electrically connected to the free end of Cable A after via PA-Switch. The other end of this cable will be attached to the Cable B and to the electrical motor, E-M of the scooter. The method of use is explained in more details at fi FIG. 12. Shows schematically the top view the unit shown at previous figure and gives the position of various parts. This figure also shows a parking switch, PA-Switch that is designed for use during the process of parking. So that when the electrical scooter is being placed inside a carrier this switch will be turned on to make the parking system functional. In this figure a cable coming from the scooters battery, Battery attaches to this switch. Originally this switch will connect the battery to a cable that is attached to the electrical Motor of the scooter, E-M and this makes the electrical circuit complete and functional. When the unit is being moved into the carrier to be parked inside it the parking switch, PA-Switch will be turned to the parking mode to connect the battery, Battery to the Cable A. Thus the electrical current will go thorough the system shown in this picture and finally reach the electrical motor of the scooter, E-M via the cable, Cable B. Then the scooter will be driven up into the carrier box means and the horn, Horn will come in contact with the left wall of the carrier and force of contact will press the horn, Horn and it will separate the plate, Plate A from the Plate B to disconnect the electrical system. The disconnection will stop the E-M and the movement of the scooter will stop. Spring means and similar things will be added to this system to allow a predicted and controlled contact of the horn, Horn with the left wall to prevent damage. When the rider wants to remove the scooter will turn the switch to the riding mode and the unit will be functional till next parking time comes.

Figure 13:
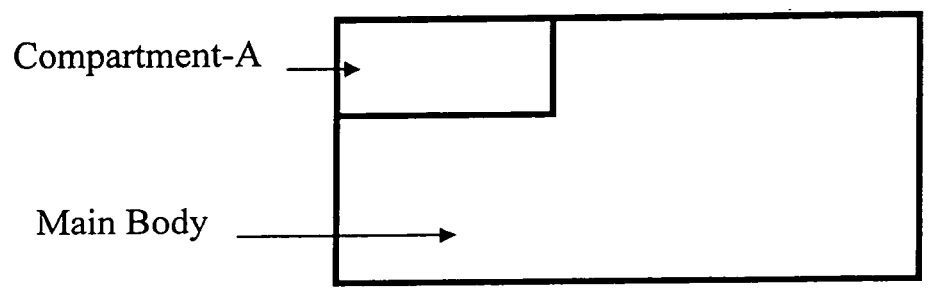
FIG. 13. Shows schematically the front view a box means that has a compartment for placement of other stuffs.

FIG. 13. Shows schematically the front view a box means that has a compartment for the placement of things such as bags or similar things. This part is to facilitate the placement of things which the user may carry. This compartment may be more than one and its shape, size and place inside the box means may vary.

THE DETAILED EXPLANATION OF THE INVENTION

The life of many humans has been easier due to the use of means such as the strollers, wheelchairs and carriers. However, the use of such objects has its own difficulties, since moving these objects by a vehicle and handling them in and out of the vehicle have their own practical problems. Commonly these units are lifted for placement in the trunk or inside a vehicle, however, manipulation of these units which commonly have a noticeable weight and a rough shape is difficult and labor intensive. In the care of strollers there are many mothers who do not have enough physical reserve for such expenditure. Also such a physical movement will increase an existing back pain of those who just had C-sections or it may cause a new back and joint pains or worsen the existing ones. These problems are even more pronounced in mothers with small body built or a compromised physical shape. To solve this problem or at least to trade it will a lesser discomfort this applicant introduces a new methods and means to allow such a process to be done easily. In this method a box means=carrier means designed for being attached to the rear of a vehicle to house these units, this carrier means has a door that opens to stand on the ground to function as a ramp. This ramp allows a wheeled unit to be held by its handle and wheeled up into the box and be kept inside the box means during movement while is protected from damages by means that are designed to do so. The ramp will close as a door and kept locked. Thus this method will simplify the process of moving a wheel chair inside the carrier and will practically eliminate the need for bending and lifting of the stroller means and will help the mothers. The box means will also function as a protector from rain, snow and the hostile environment. The prototype of this unit is shown at FIG. 1, this figure shows schematically the general and the tilted figure of the prototype of the carrier means. This carrier means consists of a rectangular shaped box means with six wall means as follows.

A. A lower wall means which is the base of this unit which has attachment means to attach to the vehicle directly, by use of attachment means, ATM or indirectly by use of the unit shown at FIG. 3.

B. The right wall of this box means has a special design and plays a vital role by acting as a door and a wall. This wall opens along a hinge means, Hinge H1, and moves to stand on the ground as a ramp, Ramp. This wall means has a pole, Pole that functions as a handle and allows the door to be pulled easily and also it stands on the ground for tolerating the weight of the object that will be rolled over the ramp, Ramp and will prevent it from caving in during such as move. Also it may be designed for holding the free end of the ramp, Ramp a short distance above the ground and preventing it from being soiled. A spring means, Spring Means shown at FIG. 2 is placed in a point that will hold this door in closed position and also will keep it in open position when the door is opened.

C. The front wall of this unit has also an important function since it is hinged at Hinge H2 to the base of the unit and it opens to allow the box to be opened either for an access for placement of objects or also to function as a ramp similar to the right wall as mentioned above for wheeling the objects on it. This wall allows the box means to be accessed for adjusting the objects placed in it. It had pad means to prevent the objects from moving, such as pad means which are shown in other figures. The door is shown in closed position in this figure.

D. The left wall of this unit functions as a wall means and it may also have a shape and pad means to prevent the object from moving and shaking during the movement of the vehicle.

E. The top wall of this unit functions as a wall means although it may have a hinge to allow it to open for accessing the box. This wall may also have a shape and pad means to prevent the object from moving.

F. The rear wall of this unit functions as a wall means. This wall may also have a shape and pad means to prevent the object from moving. Importantly, in some models this wall means may be utilized for the attachment of the carrier means to the vehicle.

Importantly, this box may have compartments to allow different things to be placed inside for easy handling.

FIG. 2. Shows the front view of the carrier means. This view shows the carrier with the right side wall in open position, functioning as a ramp, Ramp. The pole, Pole stands on the ground and prevents the free end of the door from touching the ground and being soiled. It prevents from caving of the ramp due to the weight of the object.

A spring means, Spring Means is placed in a point that will hold the door in closed position and also will keep it in open position when the door is opened.

The lower wall of this unit is the base of this unit and it shows the cross cut of an attachment pole, ATM which is like a pole and connects to the wall of a vehicle, commonly in the rear or the vehicle.

FIG. 3. Shows schematically a system of attachment means which allows the box means=the carrier means to be connected to the vehicle, and to be tilted and rotated when needed. This system has.

a. A base means, Base that allows the bottom/lower surface of the box means shown at FIG. 1-2 to be placed and attached to it. A horizontal hinge means, b. It has an attachment means, ATM which is like a pole and is designed to engaged and be connected to the body of the vehicle by a commonly used methods such as the connection means for pulling the boats.

c. A horizontal hinge means, Hinge Means 1 with a lock means, Lock Means 1. This hinge means allows the base which will have the box means on it, to be tilted on a horizontal axis. So that the rear part of the vehicle can be accessed. The lock means will keep this hinge means in a locked position. The lock means will be made from various known means so that when the lock means gets engaged the hinge means will stay in a locked condition and will not move.

d. A vertical hinge means, Hinge Means 2 with a lock means, Lock Means 2. This hinge means allows the base which will have the box means on it, to be rotated on a vertical axis. So that it will open similar to a door, to allow the rear part of the vehicle to be accessed. The lock means will keep this hinge means in a locked position. Also importantly, the lock means, Lock Means 1 and Lock Means 2 are designed to lock these hinges so that only one of hinges will be functional at a time. Also to lock both of them when desired such as during the period which the vehicle is moving.

e. Also the system has a stop means, Stop Means, which is designed to be used from moving the box means to an unwanted position such as tilting more than 90 degree or a predesigned level. In this model the stop means will come to stop at the body of the vehicle and prevent further movement of the box. Many other models of such a stop means may be used.

The base, Base has the attachment means, ATM which is like a pole and connects to the rear of a vehicle, to a commonly used attachment means in the rear of the vehicle, commonly used for pulling the trailers etc.

Importantly, the attachment pole may consist of two or more parts to allow one piece to be attached to the vehicle on permanent basis and the second part to be attached to the carrier and these two pieces to be attached to each other on a detachable re-attachable basis.

FIG. 4. Shows another view of the carrier means in order to specify some of the important parts. This figure shows the front door, Front Door in open position indicating that it can function as a ramp. This door has a lock means, Lock, which allows the door to be kept in a close position.

Also this figure shows a grid means, Grid that consists of two pieces one in the right and the other one in the left, designed to be pulled and hold the object inside the carrier means in a stable position. These grid means have retainers, Retainer that allows the grid means to be pulled and hold in a fixed position. The grid may be made from a flexible material such as a net or any other materials, such as fabrics depending the case. The function of the grid is to be pulled toward the rear wall in order to hold the object inside the box in a tight and secure position and prevent it from free movements. Initially the grid means will be posed away from the object to allow an open space for the placement of the object, however after the placement of the object the grid means will be pulled toward the rear wall of the carrier means by use of the retainer, Retainer in order to keep the object tightly. The function of the grid means is important since it prevents the damages to the object, otherwise the object will be loose inside the box while the vehicle is moving. The grid may be removed if desired. Importantly, the shape, size and various important specifics of this piece will be changed to match the need.

Also importantly, this figure shows a series of the pads means, PAD located on the inside surface of the front door. These pad means are designed to match the shape and make up of the objects so that the closure of the door will press the pad means against the object and prevent from the movement of the object and damages.

These pads may be made.

1. To be preshaped, such as shaped foams.
2. To be positioned in different places or chosen differently, such as having an attachment means such as hook and loop fastener so that their position, sizes or their selections to be changed easily.
3. They may be made from inflatable balloons or pads. So that initially the unit is flat or away from the object to allow the object to be placed then the balloon to be inflated to be functional and to hold the object tight in the proper position.
4. They may be made from adjustable pads. So that initially the pad is kept away from the object to allow the object to be placed inside the box then after the object is in place, the pad will be pushed forward by various means such as handles etc. In order to be pushed to act and hold the object tight in the proper position. In example shown in this figure the pad means, Pad is away from the object when the front wall is open, but with the closure of the door the pad means will force the object toward the rear wall and keep it stable.
5. Any restraint means which can be used for keeping the objects in place securely.
6. Combinations of various means for protection and holding the object position.

7. Importantly, the unit may have restraints that will be placed when the object is in place and the front door is open and then after the object is properly restrained the front door will be closed to further keep the object in stable position with use of its pad means etc.
8. The unit may have means such as snaps and screws in order to allow a pad means or a spring means or a restraint means to be pushed or screwed in order to make a compression against the object for holding it in the position.

Importantly, the use of these pads, balloons or the restraint means are not limited to the front door, or nay parts since these means may be also placed in other areas such as the back wall the top wall etc. In order to make the box means more hospitable and safe for the object being placed.

This figure also shows a handle, R-Hand that has two ends and one end is attached to the ramp by a hinge means and the other end is removably attached to the body of the carrier by a detachable reattachable means such as a hook and loop fastener. The detachable end of this unit allows the user to hold it and pull up the ramp without the need for bending. This will prevent from back discomfort. After the closure the free end of the R-Hand will be attached to the body of the carrier by another detachable reattachable means such as a hook and loop fastener. This handle may have an adjustable body to allow it to be longer or shorter.

FIG. 5. Shows specifically a box means, Box Means that is placed on a system of attachment means shown at FIG. 3. In this figure the position of the hinge means, Hinge Means 1 is shown, located in the base of the unit. This hinge means allows the whole unit, (the base and the box=carrier means) to be tilted forward in order to allow the rear of the car such as the trunk to be accessed. Also the position of the hinge means, Hinge Means 2 is shown located, in the vertical edge of the box means, Box Means. This hinge means allows the box means to be rotated from the rear of the vehicle, to the right side of the vehicle, so that the rear of the vehicle, such as the rear door to be accessed.

Please note that if the box means is attached to the rear door of a vehicle, then the use of the hinge means will not be needed and they can be eliminated from these units.

Importantly, the FIG. 5 also shows handle means on the front wall that attaches to a pad means inside the box means by a screw. So that by rotation of this screw means the pad means will move forward inside the box means to compress the object for holding it in the position. The rotation of these screw means in the other direction will move the pad means away from the objects.

Other means such as snaps means or handles may be also used in order to allow a pad means, a spring means or a restraint means etc., to be pushed forward for the compression against the object for holding it in the position. Other means may be used as well.

FIG. 6. Shows schematically a ramp means that consist from combination of two pieces which one of them slides over the other. In this figure the ramp, Ramp A has borders, shown as Border Wall A1 and A2 which allow the ramp, Ramp B to slide into it. This method is for allowing the length of the ramp means to be adjusted. In another method the ramp may have two pieces which folds over another.

FIG. 7. Shows schematically a cradle means, which is designed to be placed on the floor of the box means, so that it will function in keeping the objects inside more securely. This unit for example is designed to allow a wheel chair to be wheels on it and it will accept the wheels of the wheel chair and will prevent them from moving. The place for the smaller front wheels and the place for the large wheels are shown.

FIG. 8. Shows schematically a modified version of a carrier means shown at FIG. 1 which is equipped with wheels so that it allows the weight of the box means to be tolerated and transmitted to the street.

The unit may have more than one set of wheels. Also this model shows a version which an electrical method is utilized in order to open and close the door, Ramp automatically. This will eliminate the manual work for opening and closing of the ramp and is more useful when the door is heavy or the user prefers not to open or close the door by hand. The prototype of this unit is made by having a C shaped piece, C-Rot which has the engagement means, such as teeth on it and comes in contact with the teeth of the matching wheel, E-Rot from an electrical motor. So that the rotation of E-Rot will rotate the C-Rot and since the C-Rot is attached to the door means, Ramp, thus it will open or close the Ramp by use of the electrical engine means. This unit may be further intensified by use of a remote controller, Rem-Control of the electrical motor which allows the ramp to be opened and closed. This carrier means will simplify the use of this unit and will be beneficial in cases which further simplification is needed. This model will be more useful for the movement of units such as electrical scooters etc. This figure also shows the light means, light that would be connected to the signal lights of the vehicle. Also has place for a license plate, License.

FIG. 9. Shows schematically an adaptor means which allows the existing attachment means of a vehicle in the rear such as place for holding the spare tire to be modified for allowing to attach to the rear of a carrier means shown at FIG. 1. In this figure an upper plate, UP-Plate has holes, Hole which matches the location of holes from the site for mounting the spare tire. This allows this plate to be placed and screwed into the place for the spare tire. This plate means has a curved or angled area, Bent which provides a vertical distance between the first and second plate. Then the continuation of the first plate makes the lower plate, Low-Plate which is equipped with a set of screws, Screw, designed to allow the rear wall of the box means to be placed and screwed to this plate in order to be secured. This modification will allow the height of the box means to be adjusted in order to allow the ramp to be in a proper position to allow it to be easily placed on the ground for use. Importantly, the shape of this unit may be modified with various bends and shapes in order to allow it to be useful in different models of vehicle, and various positions of the attachment means. In the cases which the tire mounts to the bottom of the vehicles this unit may have a rectangular bent.

FIG. 9A. Shows schematically the side view of the adaptor means shown in previous FIG. 9. In this figure the upper plate, UP-Plate the angled area, Bent and the another plate, Low-Plate are shown. Again importantly, the angled area, Bent will have different sizes.

FIG. 10. Shows a unit similar to the version of a carrier shown at FIG. 8 except this door of this unit consists from two pieces that allows one piece, Ramp 2 to be placed on the ground to facilitate the movement of the scooter to the carrier and prevent from unwanted movement of the ramp. This provides a steady unit. After use, the Ramp 2 will fold on Ramp 1 and close. The surfaces of these ramps are covered with materials to prevent slipping of the scooter. The hinge, Hinge, is also marked.

FIG. 11. Shows schematically a method of making an electrical scooter to be placed inside a carrier means and be kept in proper position inside without hitting the opposite wall, without control to damage. This figure shows the front view of a unit consisting of various part such as a board, Board which holds two electrically conduction spring plates shown at Plate A and Plate B. These plates are electrically conductive and connected to the electrical cables, Cable A and Cable B and are in contact electrically at point Contact. Per design the plate, Plate A will separate from Plate B to disconnect the electrical system when the piece, Horn is pressed, thus it will disconnect the electrical current coming from Cable A to the Cable B. The unit has also a switch, PA-Switch which is shown at FIG. 12. This unit will be attached to the front bumper of the electrical scooter and the main cable from the electrical system of the scooter will be cut and electrically connected to the free end of Cable A after via PA-Switch. The other end of this cable will be attached to the Cable B and to the electrical motor, E-M of the scooter. The method of use is explained in more details at fi FIG. 12. Shows schematically the top view the unit shown at previous figure and gives the position of various parts. This figure also shows a parking switch, PA-Switch that is designed for use during the process of parking. So that when the electrical scooter is being placed inside a carrier this switch will be turned on to make the parking system functional. In this figure a cable coming from the scooters battery, Battery attaches to this switch. Originally this switch will connect the battery to a cable that is attached to the electrical Motor of the scooter, E-M and this makes the electrical circuit complete and functional. When the unit is being moved into the carrier to be parked inside it the parking switch, PA-Switch will be turned to the parking mode to connect the battery, Battery to the Cable A. Thus the electrical current will go thorough the system shown in this picture and finally reach the electrical motor of the scooter, E-M via the cable, Cable B. Then the scooter will be driven up into the carrier box means and the horn, Horn will come in contact with the left wall of the carrier and force of contact will press the horn, Horn and it will separate the plate, Plate A from the Plate B to disconnect the electrical system. The disconnection will stop the E-M and the movement of the scooter will stop. Spring means and similar things will be added to this system to allow a predicted and controlled contact of the horn, Horn with the left wall to prevent damage. When the rider wants to remove the scooter will turn the switch to the riding mode and the unit will be functional till next parking time comes.

FIG. 13. Shows schematically the front view a box means that has a compartment for the placement of things such as bags or similar things. This part is to facilitate the placement of things which the user may carry. This compartment may be more than one and its shape, size and place inside the box means may vary.

The Security and Comfort Means.

These units will use an alarm means for detection of an attempt for the removal of the units. This will be a battery operated alarm means that will utilize the available techniques and any new method possible in order to inform the others if someone tries to remove the unit in any form. This method may be attached to the alarm system of the cars.

Also the lock means of this unit may be attached to the locking system of the vehicle so that it can be opened from inside when desired by a remote control means. The wiring of these systems will be attached to the vehicle and controlled.

Importantly, the shape, size, materials, the relative sizes and methods used for some specific functions of these units and other characteristics of these units may vary and be different in order to allow the main purpose of these units to be achieved.

The invention claimed is:

1. A carrier for attachment to a motor vehicle to carry an object for transport by the vehicle with the carrier disposed in transport position that interferes with opening of a closure that, when open, provides access to a compartment of the vehicle, the carrier comprising:

a platform;

a hinge for hinging the platform on the vehicle for enabling the platform to swing from an orientation that the platform assumes when the carrier is in transport position to an orientation that does not interfere with opening of the closure;

an enclosure for enclosing such an object when the object is on the platform;

and locking means for locking the carrier in transport position to prevent the platform from being swung downward and the enclosure from being swung laterally outward, wherein the enclosure comprises a first wall that is hinged on the enclosure for swinging downward about a horizontal axis in excess of 90 degrees from an upright position to an inclined position for providing a ramp that allows such an object to be loaded into and unloaded from an interior space of the enclosure via the wall when in the inclined position, and wherein the enclosure comprises a second wall adjacent and at a right angle to the first wall when the first wall is in the upright, position, and the second wall comprises padding on a face that is toward the interior of the enclosure for engaging the object to aid in securing the object inside the enclosure, including a mechanism that can be operated from the exterior of the enclosure for moving the padding into engagement with the object to aid in securing the object inside the enclosure.

2. A carrier for attachment to a motor vehicle to carry an object for transport by the vehicle with the carrier disposed in transport position that interferes with opening of a closure that, when open, provides access to a compartment of the vehicle, the carrier comprising:

a platform;

a hinge for hinging the platform on the vehicle for enabling the platform to swing from an orientation that the platform assumes when the carrier is in transport position to an orientation that does not interfere with opening of the closure;

an enclosure for enclosing such an object when the object is on the platform; and locking means for locking the carrier in transport position to prevent the platform from being swung downward and the enclosure from being swung laterally outward, wherein the enclosure comprises a first wall that is hinged on the enclosure for swinging downward about a horizontal axis in excess of 90 degrees from an upright position to an inclined position for providing a ramp that allows such an object to be loaded into and unloaded from an interior space of the enclosure via the wall when in the inclined position, and further including flexible securing means inside the enclosure that can be drawn tight against the object to aid in securing the object inside the enclosure, and a pole that is attached to the first wall by a hinge and is long enough, when the first wall is inclined as a ramp, to allow a person to grasp the pole at an elevation above where the pole is attached to the ramp and use the pole to pull up the ramp.

* * * * *